United States Patent [19]

Fitzgerald et al.

[11] Patent Number: 5,156,767
[45] Date of Patent: Oct. 20, 1992

[54] EMULSION BREAKING USING ALKYLPHENOL-POLYETHYLENE OXIDE-ACRYLATE POLYMER COATED COALESCER MATERIAL

[75] Inventors: Patrick H. Fitzgerald, Pitman, N.J.; Nicholas O. Wolf; Charles R. Clark, both of Ponca City, Okla.; D. Philip Cords, Newark, Del.

[73] Assignee: Conoco Inc., Ponca City, Okla.

[21] Appl. No.: 842,732

[22] Filed: Feb. 26, 1992

Related U.S. Application Data

[63] Continuation of Ser. No. 465,667, Jan. 16, 1990, abandoned.

[51] Int. Cl.$^5$ .................... B01D 17/05; C01G 33/04; C01G 33/06
[52] U.S. Cl. .................... 252/342; 252/340; 252/358; 210/689; 210/708; 210/733; 208/188
[58] Field of Search ............... 252/331, 340, 358, 342; 210/689, 708, 733; 208/188; 428/375, 402, 260, 290

[56] References Cited

U.S. PATENT DOCUMENTS

| | | | |
|---|---|---|---|
| 3,553,149 | 1/1971 | Schoen et al. | 252/340 |
| 3,682,990 | 8/1972 | Schoen et al. | 252/340 X |
| 4,127,500 | 11/1978 | Suzuki et al. | 252/358 |
| 4,240,908 | 12/1980 | Swain et al. | 252/325 |
| 4,493,772 | 1/1985 | Tanaka | 210/799 |
| 4,985,298 | 1/1991 | Buckley et al. | 428/290 X |

*Primary Examiner*—Robert L. Stoll
*Assistant Examiner*—Daniel S. Metzmaier
*Attorney, Agent, or Firm*—Richard W. Collins

[57] ABSTRACT

A method of emulsion breaking comprising contacting an emulsion with a substrate having adhered thereto an alkylphenol-polyethylene oxide-acrylate polymer. The emulsion breaking material is used to separate water-in-oil emulsion by coalescence.

5 Claims, No Drawings

EMULSION BREAKING USING ALKYLPHENOL-POLYETHYLENE OXIDE-ACRYLATE POLYMER COATED COALESCER MATERIAL

This application is a continuation of application Ser. No. 07/465,667 filed Jan. 16, 1990 now abandoned.

BACKGROUND OF THE INVENTION

Although petroleum and water are essentially immiscible, they often attain a condition of intimate and apparent permanent emulsification. A generally accepted theory to explain the unwillingness of the dispersed material to coalesce is the presence of a third substance, term an emulsifying agent. Minute particles of this "emulsifying agent" accumulate and are retained on the interface of the discontinuous phase by adsorption forces. The emulsifying agent may be either a finely divided colloidal substance insoluble in oil or water or a substance soluble in either the oil or the water. It is known that finely-divided solid substances such as clay will promote emulsification. Further, it is known that the liquid which preferentially wets the emulsifying agent will normally be the continuous phase of the emulsion. For example, finely-divided clay is wet more readily by water than by oil and will form oil-in-water emulsions whereas carbon black and oil-saturated clay are more readily wet by oil than by water and form water-in-oil emulsions. Similarly when soluble emulsifying agents are present, the liquid in which the emulsifying agent is more soluble will become the external phase. Sodium soaps, for example, are more soluble in water than in oil and thus form oil-in-water emulsions. On the other hand calcium soaps or asphaltic materials, being soluble in oil but not in water, form water-in-oil emulsions. Naturally occurring crude petroleum emulsions are commonly of the water-in-oil type though occasionally small quantities of the inverted type are encountered.

A known method of achieving separation of emulsions is by the use of coalescence, that is, flowing the emulsion through a medium arranged in such a way that droplets of the discontinuous phase tend to adhere to a coalescing material and then to each other, the droplets accumulating in size until they form globules which separate from emulsion. Once the emulsion is broken by the formation of the droplets and globules the oil can be skimmed off the surface of the emulsion for removal and the water from the emulsion can be removed from the lower portion of the vessel in which the emulsion is being treated.

One problem which has existed with cells for coalescing oil-water emulsions is that the fine mat material which is customarily utilized as the coalescing medium becomes clogged with solid particles in a relatively short time. Most emulsions which are encountered in the petroleum industry contain solid contaminants. When an attempt is made to coalesce the oil or water from the emulsion, depending on the type of emulsion, the coalescing cells function as filters and soon the porous passageways become filled with the solid contaminants.

It would be advantageous to have a coalescer material characterized by improved porosity while maintaining coalescing effectiveness so as to permit the passage of larger particles without becoming clogged as compared with other known types of coalescer materials.

PRIOR ART

U.S. Pat. No. 4,240,908 issued to Swain et al. relates to a coalescing cell formed of metal fibers coated with an oleophilic plastic such as vinyl, epoxy, acrylic, polypropylene, polyethylene, polyvinyl, chloride, teflon or phenolic resin.

U.S. Pat. No. 3,553,149 issued to Schoen, et al. discloses a demulsifier prepared by reacting an alkylphenol-ethylene oxide reaction product and a paraffin wax oxidate.

THE INVENTION

In accordance with this invention, a polymer of alkylphenol-polyethylene oxide-acrylate is adhered to a substrate and the substrate is thereafter used in separating the components of a water-in-oil emulsion by coalescence.

DETAILED DESCRIPTION OF THE INVENTION

The alkylphenol-polyethylene oxide-acrylate polymers used in carrying out the invention are preferably homopolymers in which the alkyl group of the alkylphenol contains from 4 to 16 carbon atoms, the polyethylene oxide chains contain from 6 to 12 units, and the acrylates are derived from acrylic acid or alkylacrylic acid in which the alkyl group contains up to 2 carbon atoms.

The polymers have the general structural formula as follows:

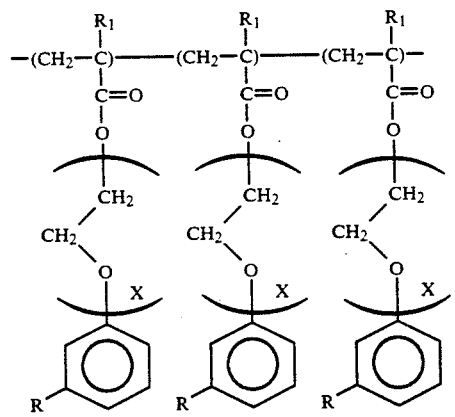

in which $R_1$ is hydrogen or alkyl, R is alkyl, and X is the number of ethylene oxide units.

The acrylate chain forms the backbone of the polymer, with appendages along the backbone of ethylene oxide units terminated by alkyl phenol groups.

The polymers are solid materials which are insoluble in crude oils and other heavy hydrocarbon oils; and are generally of high molecular weight varying from about 10,000 to about 100,000 depending on the number of polyethylene oxide units in each chain and the number of chains in the polymer.

Alkylphenols which may be used in the polymers include butylphenol, decylphenol, octylphenol, septylphenol, tetradecylphenol, pentadecyl phenol, isoctylphenol, and the like. The hydroxyl group in the phenol may be in the 1, 2 or 3 position or a mixture of alkylphenols with the hydroxyl group in differing positions may be used. Suitable acrylic acids used for the backbone include methacrylic acid, 2-ethyl acrylic acid, and the like.

As pointed out previously, the homopolymers are the preferred materials for use in the practice of the invention. It is also within the scope of the invention, however, to use copolymers. For example, in formulations containing longer ethylene oxide chains, i.e. greater than 6 to 12 units, small amounts of a second monomer may be added to the backbone of the polymer to form a copolymer. The second monomer may be selected from aryl acrylates containing one or more aromatic rings and alkyl-substituted aryl acrylates wherein the alkyl groups contain up to 8 carbon atoms. Also useful are acrylate and alkyl acrylates where the alkyl group contains up to 4 carbon atoms. Illustrative of the second monomers which may be used are such materials as ethyl acrylate, butyl acrylate, phenyl acrylate, benzyl acrylate and the like.

The monomers used to prepare the polymers and copolymers used in the practice of the invention are not novel materials. Ethoxylated acrylate and methacrylate monomers, with and without alkyl-, or alkylaryl-, end caps, are available commercially. They can be readily prepared by direct esterification of acrylic and methacrylic acids with ethoxylated alcohols or alkylphenols. However, in the art, they are normally recommended as modifiers at low levels in oligomers or polymers. Homopolymers of these materials, or copolymers containing high levels of these monomers, can be prepared using standard radical polymerization methods and typical initiators, but uses for such polymers have not been described. In the practice of the invention, normal methods of polymerization control can be employed to obtain materials of sufficient molecular weight to preclude their dissolving in the emulsion.

Each polymer provides a balance of hydrophobic and hydrophilic properties. The acrylate, the backbone of the polymer, is hydrophobic; the ethylene oxide chain is hydrophilic; and the alkyl phenol is hydrophobic. A suitable balance of hydrophobicity and hydrophilicity is important. If the polymer is too hydrophobic, it will not attract and hold sufficient numbers of water droplets to effect coalescence. On the other hand, if the polymer is too hydrophilic, water could completely wet the coalescer surface, thus obscuring the emulsion breaking pendant groups of the polymer. The properties of the polymer can be adjusted by the length of the ethylene oxide chains, by the particular acrylate used, and, as mentioned previously, by adding a second monomer in the backbone where the formulation contains longer ethylene oxide chains and thus may be more hydrophilic than is desired.

Both water-insoluble inorganic materials and organic materials may be used as substrates in the practice of the invention. Examples of the inorganic materials are silica, alumina, molecular sieves, zeolite, activated charcoal, diatomaceous earth, sand, activated clay, asbestos, carbon coke, glass fiber, and grass peat, and as for the organic materials, natural or synthetic polymers are used. Any type of the natural or synthetic polymers may be used as long as the polymers are insoluble in water.

The shape of the substrates used in carrying out the invention is not limited; however, shapes to give a large surface area are desirable. Examples of such shapes are, granules, chips, flakes, sponges, ribbons, and fibrous shapes such as fibril, filament, staple fiber, web, mat, woven fabrics, and non-woven fabrics. It is preferable to use fibrous substrate for the purpose of this invention, because of its capability of coagulating the suspended water particles of rather large diameter together with the emulsion breaking capability of the polymers used in this invention.

Natural or synthetic fibers of arbitrary deniers manufactured by the melt spinning, dry spinning, or wet spinning of polymers, mixed fibers made of the above fibers, fibrous materials manufactured by molding polymers into a film followed by slitting of the film by an arbitrary method, net-like fibrous material manufactured by the unidirectional drawing of extrudate obtained by the extrusion of polymers containing a foaming agent (for example nitrogen gas) through a slit die, composite fibers composed of two or more polymers, or other fibrous materials formed by an arbitrary method, may be used as the fibrous materials in the practice of this invention.

The polymer may be adhered to the substrate by a variety of methods. For example, a solution of the polymer in a solvent such as toluene or hexanol may be contacted with the substrate and the solvent subsequently removed by evaporation. Contact of the polymer solution with the substrate may be carried out by dipping the substrate into the solution or by spraying a mist of the solution onto the substrate. In another method the polymer may be contacted with the substrate in a molten state and thereafter cooled to solidify and adhere the polymer in a covering layer on the substrate. In still another method, a resin material which adheres both to the substrate and polymer may be placed on the substrate and thereafter the polymer may be applied to the resin covered substrate in the manners described above. In still another method, the polymer may be adhered to the substrate by carrying out polymerization of the homopolymer on the substrate.

Polymers other than the preferred homopolymers which have previously been described may also be used in the practice of the invention. For example, in the alkylphenol the alkyl group may be greater than 16 carbon atoms or the alkylphenol may contain more than 1 alkyl group attached to the ring. The polyethyleneoxide chain of 6 to 12 units may be considered a relatively short chain. A medium chain would contain from 13 as much as 20 units, while a long chain would be greater than 20 units. Polymers with medium and long chain polyethyleneoxide units find use and effectiveness with different types of crudes.

In carrying out the process of the invention the polymer-coated substrate is disposed in a suitable coalescer vessel or container. The coalescer vessel may be placed either in a vertical or horizontal position. In the case of a horizontal coalescer the polymer-coated substrate may be placed in the central portion of the vessel, occupying the entire cross-section of the vessel. The water-in-oil emulsion to be treated is introduced into one end of the coalescer and flows through the polymer-coated substrate. As the emulsion passes through this coalescing material the water droplets in the emulsion adhere to the substrate and then to each other. The droplets gradually grow in size until they form globules which separate from the emulsion. With complete separation, the liquid leaves the coalescing polymer-coated substrate as an upper stream of oil and a lower stream of water and accumulates in the other end of the coalescer vessel. The oil may then be recovered from the upper end portion of the coalescer and the water discarded from the bottom end of the vessel.

If the initial treatment does not effect complete separation of the emulsion components, the unresolved emulsion will accumulate between the upper body of oil and the lower water fraction. This unresolved emulsion may be separately withdrawn from the coalescer vessel and recycled to the emulsion feed for reprocessing.

The residence or contact time of the emulsion in the coalescing substrate will vary depending on the emulsion to be treated and composition of the polymer on the substrate. Usually the contact time will be from about 1 to about 30 minutes.

The process is usually carried out under room conditions of temperature and pressure. In some instances it may be desirable to increase the temperature of the emulsion, particularly where the oil in the emulsion is a heavy petroleum fraction, such as heavy crude oil.

While the process is directed preferably to the resolution of water-in-crude oil emulsions resulting from the production of crude oil from oil-bearing formations, it may also be applied to emulsions involving refined oils, oils transported in tankers and other emulsions which may be encountered in the handling and processing of petroleum fluids.

The enhanced coalescing effect obtained with the polymer-coated substrates of this invention is sufficiently great that the density of the substrate arrangement in a coalescing vessel can be reduced, thus allowing more unobstructed flow of the emulsion being treated. As so arranged the polymer-coated substrate is much less likely to become plugged by particles or other foreign matter present in the flowing emulsion.

The following examples are presented in illustration of the invention.

EXAMPLE 1

A nonyl phenol-polyethylene-oxide acrylate monomer was prepared by esterifying acrylic acid with an ethoxylated nonylphenol (commercially available as Triton surfactant). The monomer so prepared was mixed with an initiator (azobis 2, 2' azobis 2,4 dimethylpentane nitrile) and excelsior in acetone at room temperature. The acetone was allowed to evaporate and the mixture of monomer initiator and excelsior was subjected to vacuum at 80° C. over night. The resulting polymer coated excelsior product contained about 30% by weight of polymer.

180 ml of Hutton crude oil and 180 ml of brine produced from the Tisdale Field were combined and blended for 90 seconds in a Ross homogenizer at 100° F. The resulting emulsion was poured to the 100 ml graduation in each of two graduated funnels. One of the funnels contained untreated excelsior and the other contained polymer coated excelsior prepared as previously described. Both funnels were maintained at 100° F. for 4 minutes and then each funnel was drained into a 100 ml cylinder. The cylinders were allowed to set for 30 minutes after which the amount of water separated from the emulsion was measured. The tests showed that 18% water broke out of the emulsion contacted with the polymer coated excelsior, and no water broke out of the emulsion placed in the funnel with untreated excelsior.

EXAMPLE 2

In this example flow tests were carried out to examine the performance of packings in a dynamic situation. Flow tubes were made out of 1½ inch diameter glass tubing approximately 8 inches long and having a volume of approximately 120 ml. One flow tube was packed with untreated excelsior, the other was filled with polymer coated excelsior prepared as described in Example 1. Both tubes were packed with a density of 21.4 grams per liter. Emulsion of 60% Hutton oil and 40% brine was prepared in a Ross homogenizer at 70° F. by blending at a speed of 300 rpm for 90 seconds. The emulsion was passed through the flow tubes at various flow rates at a temperature 100° F. The results are shown in Table 1.

TABLE 1

| FLOW TEST WITH HUTTON CRUDE AT 100° F. | | | | | | |
|---|---|---|---|---|---|---|
| Excelsior Packing | Emulsion Flow Rate ml/min. | Contact Time (min) | Volume Oil (ml) | Volume Water (ml) | Total | % Water |
| Polymer Coated | 120 | 1 | 77 | 23 | 100 | 23 |
| Untreated | 120 | 1 | 100 | — | 100 | 0 |
| Polymer Coated | 60 | 2 | 97 | 6 | 103 | 6 |
| Untreated | 60 | 2 | 95 | — | 95 | 0 |
| Polymer Coated | 30 | 4 | 93 | 7 | 100 | 7 |
| Untreated | 30 | 4 | 100 | — | 100 | 0 |
| Polymer Coated | 17 | 7 | 94 | 6 | 100 | 6 |
| Untreated | 17 | 7 | 100 | — | 100 | 0 |

It is noted from the table that 23% of the water was separated from the emulsion passing through the flow tube containing polymer coated excelsior with an emulsion contact time of 1 minute. No water separated from the emulsion flowed through the untreated excelsior. In each of the runs with higher contact times, the amount of water separated from the emulsion was reduced; however, in each instance contact with the polymer coated excelsior provided water separation while no water separated from the emulsion contacted with untreated excelsior.

Similar tests were carried out at 120° F. using the same Hutton crude-tap water emulsion. The results of these tests are presented in Table 2.

TABLE 2

| FLOW TEST WITH HUTTON CRUDE AT 120° F. | | | | | | |
|---|---|---|---|---|---|---|
| Excelsior Packing | Emulsion Flow Rate ml/min. | Contact Time (min) | Volume Oil (ml) | Volume Water (ml) | Total | % Water |
| Polymer Coated | 120 | 1 | 65 | 35 | 100 | 35 |
| Untreated | 120 | 1 | 83 | 17 | 100 | 17 |
| Polymer Coated | 60 | 2 | 64 | 36 | 100 | 36 |
| Untreated | 60 | 2 | 82 | 18 | 100 | 18 |
| Polymer Coated | 30 | 4 | 60 | 40 | 100 | 40 |
| Untreated | 30 | 4 | 60 | 40 | 100 | 40 |
| Polymer Coated | 25 | 4.8 | 60 | 40 | 100 | 40 |
| Untreated | 25 | 4.8 | 61 | 39 | 100 | 39 |

It is noted from the table that the polymer coated fiber provided twice as much water break out at the contact times of 1 and 2 minutes. At the longer contact times the percent water broken out was equal. The latter result was probably due to the temperature effects whereas the results at the shorter times were due to the polymer coated fiber.

While certain embodiments and details have been shown for the purpose of illustrating the present invention, it will be apparent to those skilled in the art that various changes and modifications may be made herein without departing from the spirit or scope of the invention.

I claim:

1. A process for breaking a water-in-oil emulsion which comprises contacting said emulsion with a substrate which is coated with an alkylphenol-polyethylene oxide-acrylate polymer.

2. The process of claim 1 in which the oil of said emulsion is a naturally occurring crude petroleum oil.

3. The process of claim 2 in which the alkyl group of the alkylphenol component of the polymer contains from 4 to 16 carbon atoms and the polyethylene oxide chains in the polymer contain from 6 to 12 units.

4. The process of claim 3 in which the acrylate is an alkylacrylate in which the alkyl group contains up to 4 carbon atoms.

5. The process of claim 4 in which a second monomer selected from the group consisting of (a) unsubstituted aryl acrylates containing one or more aromatic rings, (b) alkyl substituted aryl acrylates containing one or more aromatic rings and in which the alkyl group contains up to 8 carbon atoms, (c) unsubstituted acrylate, and (d) alkyl substituted acrylates in which the alkyl group contains up to 4 carbon atoms.

* * * * *